United States Patent
Zhao et al.

(10) Patent No.: US 11,108,531 B2
(45) Date of Patent: Aug. 31, 2021

(54) METHOD AND APPARATUS FOR SETTING SYMBOL

(71) Applicant: HUAWEI TECHNOLOGIES CO., LTD., Guangdong (CN)

(72) Inventors: Yueying Zhao, Shanghai (CN); Jian Zhang, Shenzhen (CN); Ju Liu, Reading (GB); Dongyu Chu, Shanghai (CN); Changqing Zhu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/369,353

(22) Filed: Mar. 29, 2019

(65) Prior Publication Data

US 2019/0229881 A1    Jul. 25, 2019

Related U.S. Application Data

(63) Continuation of application No. PCT/CN2017/103157, filed on Sep. 25, 2017.

(30) Foreign Application Priority Data

Sep. 30, 2016  (CN) .......................... 201610877415.6

(51) Int. Cl.
  *H04W 72/04* (2009.01)
  *H04L 5/00* (2006.01)
  *H04L 27/26* (2006.01)

(52) U.S. Cl.
  CPC .......... *H04L 5/0094* (2013.01); *H04L 5/0007* (2013.01); *H04L 5/0051* (2013.01);
  (Continued)

(58) Field of Classification Search
  CPC ... H04L 5/0094; H04L 27/2602; H04L 27/26; H04L 5/0007; H04L 5/0051;
  (Continued)

(56) References Cited

U.S. PATENT DOCUMENTS

2010/0232285 A1   9/2010   Lee et al.
2016/0066321 A1   3/2016   Yu
(Continued)

FOREIGN PATENT DOCUMENTS

CN    102055706 A   5/2011
CN    102739594 A   10/2012
(Continued)

OTHER PUBLICATIONS

International Search Report dated Dec. 25, 2017 in corresponding International Patent Application No. PCT/CN2017/103157 (4 pages).
(Continued)

*Primary Examiner* — Peter P Chau
(74) *Attorney, Agent, or Firm* — Leydig, Voit & Mayer, Ltd.

(57) ABSTRACT

Embodiments of this application provide a method and an apparatus for setting a symbol in a communications system that uses a plurality of subcarrier spacings. The method includes: obtaining, by a terminal, a length of a reference blank symbol, where the length of the reference blank symbol is associated with a first subcarrier spacing, and the first subcarrier spacing is a minimum subcarrier spacing in the plurality of subcarrier spacings; and setting, by the terminal based on the length of the reference blank symbol and time domain information of the reference blank symbol, a blank symbol for a subcarrier corresponding to a second subcarrier spacing in the plurality of subcarrier spacings. According to the method and apparatus for setting a symbol provided in the embodiments of this application, when setting, based on the length of the reference symbol, a blank symbol in a subframe corresponding to a subcarrier used by the terminal, the terminal may set one or more complete symbols as blank symbols. This avoids a case in which a symbol cannot work normally because a part of the symbol (Continued)

A base station obtains a length of a reference blank symbol — S201

The base station sets, based on the length of the reference blank symbol and time domain information of the reference blank symbol, a blank symbol for a subcarrier corresponding to at least one subcarrier spacing — S202 is set as a blank symbol, thereby improving spectral efficiency of the system.

21 Claims, 4 Drawing Sheets

(52) U.S. Cl.
CPC .......... *H04L 27/26* (2013.01); *H04L 27/2602* (2013.01); *H04L 27/2613* (2013.01); *H04W 72/0446* (2013.01); *H04W 72/0453* (2013.01); *H04L 5/0062* (2013.01); *H04L 5/0066* (2013.01)

(58) Field of Classification Search
CPC . H04L 27/2613; H04L 5/0066; H04L 5/0062; H04L 5/0082; H04W 72/0446; H04W 72/0453
See application file for complete search history.

(56) References Cited

U.S. PATENT DOCUMENTS

| | | | |
|---|---|---|---|
| 2017/0094650 A1* | 3/2017 | Chen | H04L 5/0007 |
| 2017/0325250 A1* | 11/2017 | Manolakos | H04W 72/1205 |
| 2019/0200315 A1* | 6/2019 | Tsai | H04W 48/20 |
| 2019/0207728 A1* | 7/2019 | Zhou | H04L 27/2607 |
| 2019/0229867 A1* | 7/2019 | Yi | H04L 5/0048 |

FOREIGN PATENT DOCUMENTS

| | | |
|---|---|---|
| CN | 102740375 A | 10/2012 |
| CN | 105099642 A | 11/2015 |
| CN | 105656597 A | 6/2016 |
| WO | 2016146165 A1 | 9/2016 |

OTHER PUBLICATIONS

International Search Report, dated Dec. 25, 2017, in International Application No. PCT/CN2017/103157 (4 pp.).

"TDD Frame Structure with Mixed Numerology," 3GPP TSG RAN WG1 Meeting #86, Gothenburg, Sweden, R1-166676, XP051140334A, pp. 1-4, 3rd Generation Partnership Project, Valbonne, France (Aug. 22-26, 2016).

"Design Considerations on Guard Period for NR Frame Structure," 3GPP TSG RAN WG1 Meeting #86, Gothenburg, Sweden, R1-167732, XP051126063, pp. 1-4, 3rd Generation Partnership Project, Valbonne, France (Aug. 22-26, 2016).

"Mixed Numerology in an OFDM System," 3GPP TSG RAN WG1 Meeting #85, Nanjing, R1-164623, XP051090153, pp. 1-7, 3rd Generation Partnership Project, Valbonne, France (May 23-27, 2016).

"Guard Period Setting in TDD based NR Frame Structure," 3GPP TSG RAN WG1 Meeting #86, Gothenburg, Sweden, R1-166675, XP05114033, pp. 1-9, 3rd Generation Partnership Project, Valbonne, France (Aug. 22-26, 2016).

\* cited by examiner

METHOD AND APPARATUS FOR SETTING SYMBOL

CROSS-REFERENCE TO RELATED APPLICATIONS

This application is a continuation of International Application No. PCT/CN2017/103157, filed on Sep. 25, 2017, which claims priority to Chinese Patent Application No. 201610877415.6, filed on Sep. 30, 2016. The disclosures of the aforementioned applications are hereby incorporated by reference in their entireties.

TECHNICAL FIELD

Embodiments of this application relate to communications technologies, and in particular, to a method and an apparatus for setting a symbol.

BACKGROUND

A 5G communications system may use a plurality of subcarrier spacings (numerology), so that a base station and a terminal device in the communications system can use different subcarrier spacings for different services, different deployment scenarios, and different spectrums.

Currently, in discussion on standards of the 5G communications system, some blank symbols (blank symbols) are allowed in a subframe and used in some specific application scenarios. To be specific, these blank symbols are symbols neither used to transmit service data nor used to transmit any signaling, and are only used to transmit a specific signal or implement a specific function in a specific scenario. The foregoing specific application scenario may be, for example, a dynamic TDD interference measurement scenario, an electromagnetic perception measurement scenario, and a listen-before-talk (Listen-Before-Talk, LBT) scenario of an unlicensed spectrum.

Therefore, when a communications system uses a plurality of subcarrier spacings, how to determine a length of a blank symbol corresponding to a subcarrier of each subcarrier spacing is a problem to be urgently resolved.

SUMMARY

Embodiments of this application provide a method and an apparatus for setting a symbol, to resolve a prior-art technical problem of how to determine a length of a blank symbol corresponding to a subcarrier of each subcarrier spacing when a communications system uses a plurality of subcarrier spacings.

A first aspect of the embodiments of this application provides a method for setting a symbol in a communications system that uses a plurality of subcarrier spacings, including: obtaining, by a terminal, a length of a reference blank symbol, where the length of the reference blank symbol is associated with a first subcarrier spacing, and the first subcarrier spacing is a minimum subcarrier spacing in the plurality of subcarrier spacings; and setting, by the terminal based on the length of the reference blank symbol and time domain information of the reference blank symbol, a blank symbol for a subcarrier corresponding to a second subcarrier spacing in the plurality of subcarrier spacings.

According to the method for setting a symbol provided in the first aspect, in the communications system using the plurality of subcarrier spacings, after obtaining the length that is of the reference blank symbol and that is associated with the minimum subcarrier spacing in the plurality of subcarrier spacings, the terminal may set, based on the length of the reference blank symbol and the time domain information of the reference blank symbol, a blank symbol for a subcarrier corresponding to another subcarrier spacing in the plurality of subcarrier spacings. In this way, when setting, based on the length of the reference symbol, a blank symbol in a subframe corresponding to a subcarrier used by the terminal, the terminal may set one or more complete symbols as blank symbols. This avoids a case in which a symbol cannot work normally because a part of the symbol is set as a blank symbol, thereby improving spectral efficiency of the system.

Optionally, the time domain information of the reference blank symbol is used to indicate a location of the reference blank symbol in a subframe corresponding to a reference subcarrier, and the reference subcarrier is a subcarrier corresponding to the first subcarrier spacing.

For example, the time domain information of the reference blank symbol includes first time domain information; or the time domain information of the reference blank symbol includes first time domain information and second time domain information. The first time domain information includes a symbol number of the reference blank symbol, and the second time domain information includes a subframe number of the reference blank symbol and/or a frame number of the reference blank symbol.

According to the method for setting a symbol provided in this possible implementation, the terminal can use a plurality of manners to set, based on the time domain information of the reference blank symbol and the length of the reference blank symbol, a blank symbol for a subcarrier used by the terminal. This increases flexibility of setting a symbol by the terminal, so that the foregoing symbol setting manner is applicable to more extensive scenarios, further improving spectral efficiency of the system.

Optionally, the obtaining a length of a reference blank symbol includes: obtaining the length of the reference blank symbol based on a preset reference subcarrier spacing, where the reference subcarrier spacing is the first subcarrier spacing; or obtaining the length of the reference blank symbol based on length information of the reference blank symbol.

Optionally, the length information of the reference blank symbol includes a subcarrier spacing set including the plurality of subcarrier spacings; and the obtaining the length of the reference blank symbol based on length information of the reference blank symbol includes: obtaining the length of the reference blank symbol based on the first subcarrier spacing in the subcarrier spacing set.

For example, the obtaining the length of the reference blank symbol based on the first subcarrier spacing in the subcarrier spacing set includes: using, as the length of the reference blank symbol, duration corresponding to a sum of a derivative and a cyclic prefix that are of the first subcarrier spacing.

Optionally, the length information of the reference blank symbol includes a mini slot set including mini slots corresponding to the plurality of subcarrier spacings; and the obtaining the length of the reference blank symbol based on length information of the reference blank symbol includes: obtaining the length of the reference blank symbol based on a first mini slot in the mini slot set, where the first mini slot is a maximum mini slot in the mini slot set, and the first mini slot is a mini slot corresponding to the first subcarrier spacing.

For example, the obtaining the length of the reference blank symbol based on a first mini slot in the mini slot set includes: using duration corresponding to the first mini slot as the length of the reference blank symbol.

Optionally, the length information of the reference blank symbol includes any one of the following: a subcarrier spacing corresponding to the reference blank symbol, the length of the reference blank symbol, and a mini slot corresponding to the reference blank symbol.

Optionally, the length information of the reference blank symbol further includes frequency domain information of the reference blank symbol.

According to the method for setting a symbol provided in this possible implementation, the blank symbol can be set more flexibly, so that the foregoing symbol setting manner is applicable to more extensive scenarios.

A second aspect of the embodiments of this application provides a method for setting a symbol in a communications system that uses a plurality of subcarrier spacings, including: obtaining, by a base station, a length of a reference blank symbol, where the length of the reference blank symbol is associated with a first subcarrier spacing, and the first subcarrier spacing is a minimum subcarrier spacing in the plurality of subcarrier spacings; and setting, by the base station based on the length of the reference blank symbol and time domain information of the reference blank symbol, a blank symbol for a subcarrier corresponding to at least one subcarrier spacing.

According to the method for setting a symbol provided in the second aspect, in the communications system using the plurality of subcarrier spacings, after obtaining the length that is of the reference blank symbol and that is associated with the minimum subcarrier spacing in the plurality of subcarrier spacings, the base station may set, based on the length of the reference blank symbol and the time domain information of the reference blank symbol, a blank symbol for a subcarrier of one or more subcarrier spacings used in the communications system. In this way, when setting, based on the length of the reference symbol, a blank symbol in a subframe corresponding to the subcarrier of the one or more subcarrier spacings used in the communications system, the base station may set one or more complete symbols as blank symbols. This avoids a case in which a symbol cannot work normally because a part of the symbol is set as a blank symbol, thereby improving spectral efficiency of the system.

Optionally, the time domain information of the reference blank symbol is used to indicate a location of the reference blank symbol in a subframe corresponding to a reference subcarrier, and the reference subcarrier is a subcarrier corresponding to the first subcarrier spacing.

Optionally, the setting, by the base station based on the length of the reference blank symbol and time domain information of the reference blank symbol, a blank symbol for a subcarrier corresponding to at least one subcarrier spacing includes: setting, by the base station based on the length of the reference blank symbol and the time domain information of the reference blank symbol, a blank symbol for a subcarrier corresponding to each subcarrier spacing; or setting, by the base station based on the length of the reference blank symbol and the time domain information of the reference blank symbol, a blank symbol for the subcarrier corresponding to the first subcarrier spacing, and setting a subband width corresponding to the first subcarrier spacing to full bandwidth.

According to the method for setting a symbol provided in this possible implementation, the blank symbol can be set more flexibly, so that the foregoing symbol setting manner is applicable to more extensive scenarios.

For example, the time domain information of the reference blank symbol includes first time domain information; or the time domain information of the reference blank symbol includes first time domain information and second time domain information. The first time domain information includes a symbol number of the reference blank symbol, and the second time domain information includes a subframe number of the reference blank symbol and/or a frame number of the reference blank symbol.

According to the method for setting a symbol provided in this possible implementation, a terminal can use a plurality of manners to set, based on the time domain information of the reference blank symbol and the length of the reference blank symbol, a blank symbol for a subcarrier used by the terminal. This increases flexibility of setting a symbol by the terminal, so that the foregoing symbol setting manner is applicable to more extensive scenarios, further improving spectral efficiency of the system.

Optionally, the obtaining a length of a reference blank symbol includes: obtaining the length of the reference blank symbol based on a preset reference subcarrier spacing, where the reference subcarrier spacing is the first subcarrier spacing; or obtaining the length of the reference blank symbol based on length information of the reference blank symbol.

Optionally, the length information of the reference blank symbol includes a subcarrier spacing set including the plurality of subcarrier spacings; and the obtaining the length of the reference blank symbol based on length information of the reference blank symbol includes: obtaining the length of the reference blank symbol based on the first subcarrier spacing in the subcarrier spacing set.

For example, the obtaining the length of the reference blank symbol based on the first subcarrier spacing in the subcarrier spacing set includes: using, as the length of the reference blank symbol, duration corresponding to a sum of a derivative and a cyclic prefix that are of the first subcarrier spacing.

Optionally, the length information of the reference blank symbol includes a mini slot set including mini slots corresponding to the plurality of subcarrier spacings; and the obtaining the length of the reference blank symbol based on length information of the reference blank symbol includes: obtaining the length of the reference blank symbol based on a first mini slot in the mini slot set, where the first mini slot is a maximum mini slot in the mini slot set, and the first mini slot is a mini slot corresponding to the first subcarrier spacing.

For example, the obtaining the length of the reference blank symbol based on a first mini slot in the mini slot set includes: using duration corresponding to the first mini slot as the length of the reference blank symbol.

Optionally, the length information of the reference blank symbol includes any one of the following: a subcarrier spacing corresponding to the reference blank symbol, the length of the reference blank symbol, and a mini slot corresponding to the reference blank symbol.

Optionally, the length information of the reference blank symbol further includes frequency domain information of the reference blank symbol.

According to the method for setting a symbol provided in this possible implementation, the blank symbol can be set more flexibly, so that the foregoing symbol setting manner is applicable to more extensive scenarios.

A third aspect of the embodiments of this application provides an apparatus for setting a symbol in a communications system that uses a plurality of subcarrier spacings. The apparatus includes a module or a means (means) configured to perform the method provided in any one of the first aspect or the implementations of the first aspect.

A fourth aspect of the embodiments of this application provides an apparatus for setting a symbol in a communications system that uses a plurality of subcarrier spacings. The apparatus includes a module or a means (means) configured to perform the method provided in any one of the second aspect or the implementations of the second aspect.

A fifth aspect of the embodiments of this application provides an apparatus for setting a symbol in a communications system that uses a plurality of subcarrier spacings. The apparatus includes a processor and a memory. The memory is configured to store a program, and the processor invokes the program stored in the memory, to perform the method provided in the first aspect of this application.

A sixth aspect of the embodiments of this application provides an apparatus for setting a symbol in a communications system that uses a plurality of subcarrier spacings. The apparatus includes a processor and a memory. The memory is configured to store a program, and the processor invokes the program stored in the memory, to perform the method provided in the second aspect of this application.

A seventh aspect of the embodiments of this application provides an apparatus for setting a symbol in a communications system that uses a plurality of subcarrier spacings. The apparatus includes at least one processing component (or chip) configured to perform the method in the first aspect.

An eighth aspect of the embodiments of this application provides an apparatus for setting a symbol in a communications system that uses a plurality of subcarrier spacings. The apparatus includes at least one processing component (or chip) configured to perform the method in the second aspect.

A ninth aspect of the embodiments of this application provides a program. The program is executed by a processor to perform the method in the first aspect.

A tenth aspect of the embodiments of this application provides a program product, for example, a computer-readable storage medium. The program product includes the program in the ninth aspect.

An eleventh aspect of the embodiments of this application provides a program. The program is executed by a processor to perform the method in the second aspect.

A twelfth aspect of the embodiments of this application provides a program product, for example, a computer-readable storage medium. The program product includes the program in the eleventh aspect.

According to the method and the apparatus for setting a symbol provided in the embodiments of this application, in the communications system using the plurality of subcarrier spacings, after obtaining the length that is of the reference blank symbol and that is associated with the minimum subcarrier spacing in the plurality of subcarrier spacings, the base station or the terminal may set, based on the length of the reference blank symbol and the time domain information of the reference blank symbol, a blank symbol for a subcarrier corresponding to any subcarrier spacing. In this way, when setting, based on the length of the reference symbol, a blank symbol for a subcarrier corresponding to a subcarrier spacing, the base station or the terminal may set one or more complete symbols as blank symbols. This avoids a case in which a symbol cannot work normally because a part of the symbol is set as a blank symbol, thereby improving spectral efficiency of the system.

DESCRIPTION OF EMBODIMENTS

Figure 1:
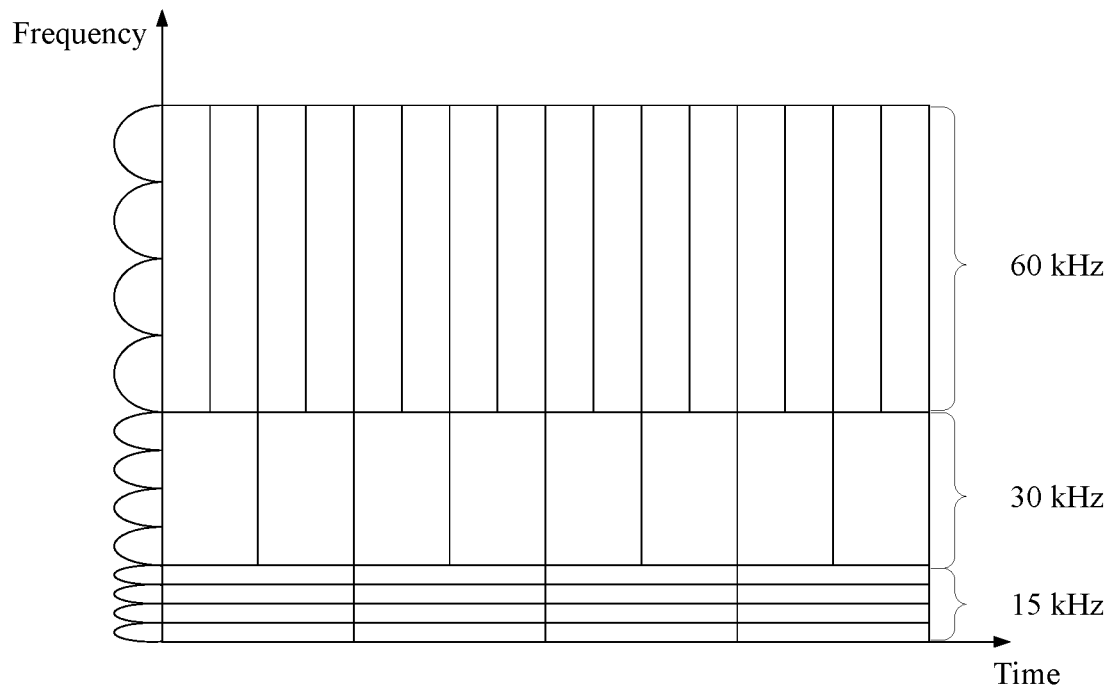
FIG. 1 is a schematic diagram of a correspondence between a subcarrier spacing and a symbol according to an embodiment of this application.

The following explains and describes some terms in the embodiments of this application, to facilitate understanding by persons skilled in the art.

A base station, also referred to as a radio access network (Radio Access Network, RAN) device, is a device connecting a terminal to a wireless network, and may be a base transceiver station (Base Transceiver Station, BTS) in a Global System for Mobile Communications (Global System of Mobile communication, GSM) or Code Division Multiple Access (Code Division Multiple Access, CDMA), a NodeB (NodeB, NB) in Wideband Code Division Multiple Access (Wideband Code Division Multiple Access, WCDMA), an evolved NodeB (Evolutional Node B, eNB or eNodeB for short) in Long Term Evolution (Long Term Evolution, LTE), a relay node or an access point, a base station in a future 5G network, or the like. This is not limited herein.

A terminal may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (Radio Access Network, RAN). The wireless terminal may be a mobile terminal, such as a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (Personal Communication Service, PCS) phone, a cordless telephone set, a Session Initiation Protocol (Session Initiation Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile console (Mobile), a remote station (Remote Station), a remote terminal (Remote Terminal), an access terminal (Access Terminal), a user terminal (User Terminal), a user agent (User Agent), or a user device (User Device or User Equipment). This is not limited herein.

In the embodiments of this application, the term "a plurality of" means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

A 5G communications system may simultaneously use a plurality of different subcarrier spacings (numerology) on a same frequency, so that a base station and a terminal device in the communications system can use different subcarrier spacings for different services, different deployment scenarios, and different spectrums. The service may be, for example, an enhanced mobile broadband (enhanced Mobile Broadband, eMBB) service, a massive machine type communications (Massive Machine Type Communication, mMTC) service, an ultra-reliable and low latency communications, (Ultra-reliable and low latency communications, URLLC) service, a Multimedia Broadcast Multicast Service (Multimedia Broadcast Multicast Service, MBMS), or a positioning service. The deployment scenario may be, for example, an indoor hotspot scenario, a dense urban area scenario, a suburban area scenario, an urban area macro coverage scenario, or a high-speed railway scenario. The spectrum may be, for example, any frequency range within 100 GHz.

Subframes corresponding to subcarriers (that is, transmission time intervals corresponding to the subcarriers, where the time interval may include a plurality of symbols) within all subcarrier spacings have same duration, and symbol lengths of the corresponding subframes are also the same. However, subframe duration corresponding to the subcarrier spacings may be the same or different. Symbol lengths corresponding to the subcarrier spacings are also different. FIG. 1 is a schematic diagram of a correspondence between a subcarrier spacing and a symbol according to an embodiment of this application. It is assumed that the foregoing communications system uses three subcarrier spacings: a 15 kHz subcarrier spacing, a 30 kHz subcarrier spacing, and a 60 kHz subcarrier spacing. The base station and the terminal use the 60 kHz subcarrier spacing when transmitting the eMBB service, use the 15 kHz subcarrier spacing when transmitting the mMTC service, and use the 30 kHz subcarrier spacing when transmitting the URLLC service. FIG. 1 shows a corresponding quantity of symbols of each subcarrier spacing in a same time length (the symbol shown herein may be a symbol including a cyclic prefix). As shown in FIG. 1, in the same time length, the 15 kHz subcarrier spacing is corresponding to four symbols, the 30 kHz subcarrier spacing is corresponding to eight symbols, and the 60 kHz subcarrier spacing is corresponding to 16 symbols. In other words, a smaller subcarrier spacing is corresponding to a longer symbol length. It can be learned from the foregoing example that different subcarrier spacings are corresponding to different symbol lengths and there is a multiple relationship between symbol quantities corresponding to the subcarrier spacings.

Based on current discussion on standards of the 5G communications system, in the 5G communications system, there may be some specific application scenarios in which some blank symbols (blank symbols for short) need to be used, that is, some symbols that are neither used to transmit service data nor used to transmit signaling are used to transmit a specific signal or implement a specific function. For example, these specific application scenarios may be as follows:

A first scenario is a dynamic time division duplex (Time-Division Duplex, TDD) interference measurement application scenario.

Specifically, a dynamic TDD technology is introduced into the 5G communications system. In other words, different cells may use different TDD configurations. By using the dynamic TDD technology, various base stations may flexibly deploy services. However, when the dynamic TDD technology is used for communication, base stations and terminal devices in various cells use channels with a same frequency to send and receive data. As a result, when a base station and/or a terminal device send/sends data by using the dynamic TDD technology, cross interference may be easily caused to a base station and a terminal that are sending data within a coverage range of an adjacent cell. Therefore, to avoid cross interference, a base station and/or a terminal that are/is to send data may use a blank symbol to send a cross interference interception signal, to perform cross interference measurement before sending the data. In this way, the base station and/or the terminal that are/is to send the data may adjust, based on a cross interference measurement result, respective transmit power when sending the data, to eliminate or suppress cross interference.

A second scenario is an electromagnetic perception application scenario.

Specifically, a radar signal bounces off an object. Therefore, in communication, a base station may use a blank symbol to send the radar signal, so that a radar receiver disposed at the base station receives the radar signal that bounces back, to implement interception of a wireless environment around the base station to provide assistance for network planning and deployment. The radar signal described herein may be a linear frequency modulation (linear frequency modulation, LFM) signal, or may be a modulation signal that approximates a linear modulation signal by using an orthogonal frequency division multiplexing (Orthogonal Frequency Division Multiplexing, OFDM) modulation signal. For example, approximating LFM by using an OFDM modulation signal may be specifically making subcarriers of a plurality of adjacent OFDM symbols rise in a stepwise manner in frequency domain, so that the adjacent OFDM symbols form approximate slopes, to approximate an LFM waveform.

A third scenario is a listen-before-talk (Listen-Before-Talk, LBT) application scenario of an unlicensed spectrum.

Specifically, by using a carrier aggregation (Carrier Aggregation, CA) technology, a licensed-assisted access using Long Term Evolution (Licensed-Assisted Access using Long Term Evolution, LAA-LTE) system may use 5 GHz license-free spectrums (also referred to as unlicensed spectrums) to extend existing LTE services, that is, use license-free spectrums to carry some data services in an LTE system. Therefore, to share a license-free spectrum with another system, a terminal device in the LAA-LTE system uses a listen-before-talk (Listen-Before-Talk, LBT) channel access mechanism when using the license-free spectrum to send data. To be specific, before sending data, a base station and/or the terminal device access/assesses, in a blank symbol, all channels on the license-free spectrum through clear channel assessment (Clear Channel Assessment, CCA); and when determining, through assessment, that all the channels on the license-free spectrum are idle, the base station and/or the terminal device use/uses the license-free spectrum to send the data.

It can be learned from the foregoing description that some blank symbols need to be reserved in the 5G communications system to support the foregoing specific application scenarios. In addition, to enable all terminals or base stations corresponding to subcarriers of various subcarrier spacings to use these blank symbols, a blank symbol needs to be set in a subframe corresponding to a subcarrier of each subcarrier spacing.

However, in the 5G communications system, subcarriers of different subcarrier spacings are corresponding to different symbol lengths. If the blank symbol is set for the subcarrier of each subcarrier spacing based on a symbol length corresponding to any subcarrier spacing, a symbol corresponding to another subcarrier spacing less than the subcarrier spacing cannot work normally. Still referring to FIG. 1, it is assumed that a first symbol shown in FIG. 1 is set as a blank symbol based on a symbol length corresponding to a subcarrier of the 30 kHz subcarrier spacing. In this case, because a length of a first symbol corresponding to a subcarrier of the 15 kHz subcarrier spacing is greater than a length of the blank symbol, if a blank symbol is set for the subcarrier of the 15 kHz subcarrier spacing based on the symbol length corresponding to the subcarrier of the 30 kHz subcarrier spacing, the first symbol corresponding to the subcarrier of the 15 kHz subcarrier spacing cannot work normally, reducing spectral efficiency of the system. Therefore, when a communications system uses a plurality of subcarrier spacings, how to determine a length of a blank symbol corresponding to a subcarrier of each subcarrier spacing is a problem to be urgently resolved.

In consideration of these cases, the embodiments of this application provide a method for setting a symbol, to resolve a technical problem of how to determine a length of a blank symbol corresponding to a subcarrier of each subcarrier spacing when a communications system uses a plurality of subcarrier spacings.

Specific embodiments are used below to describe in detail the technical solutions of this application. The following several specific embodiments may be combined with each other, and a same or similar concept or process may not be described repeatedly in some embodiments.

Figure 2:
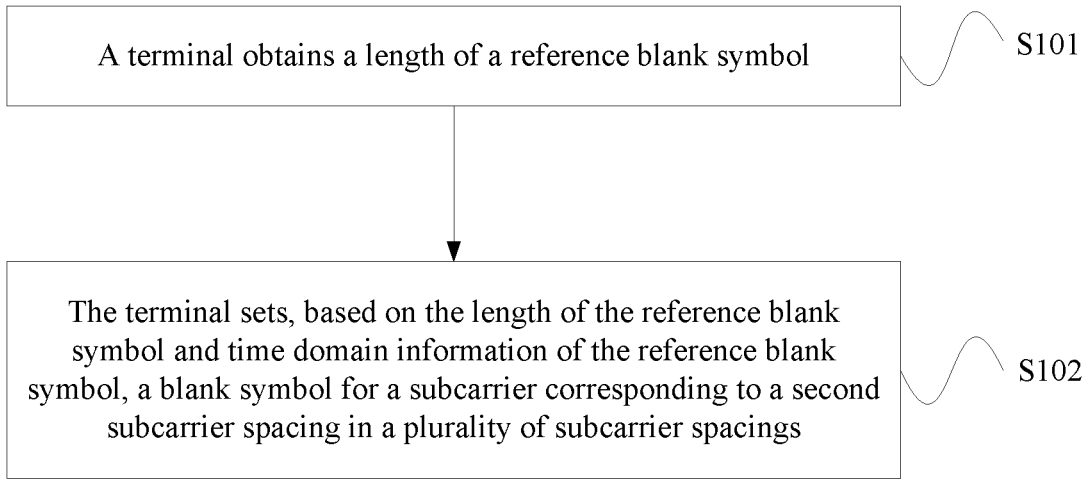
FIG. 2 is a schematic flowchart of a method for setting a symbol according to an embodiment of this application.

FIG. 2 is a schematic flowchart of a method for setting a symbol according to an embodiment of this application. This embodiment relates to a specific process in which a terminal sets, based on an obtained length of a reference blank symbol and time domain information of the reference blank symbol, a blank symbol for a subcarrier corresponding to a second subcarrier spacing in a plurality of subcarrier spacings. As shown in FIG. 2, the method includes the following steps.

S101. A terminal obtains a length of a reference blank symbol.

Specifically, the terminal may be a terminal in "a communications system using a plurality of subcarrier spacings". The plurality of subcarrier spacings include at least a first subcarrier spacing and a second subcarrier spacing. Both the first subcarrier spacing and the second subcarrier spacing may be subcarrier spacings currently used by the terminal, or the second subcarrier spacing is a subcarrier spacing currently used by the terminal. In this embodiment, the length of the reference blank symbol, that is, duration occupied by the reference blank symbol in time domain, is associated with a minimum subcarrier spacing (that is, the first subcarrier spacing) in the plurality of subcarrier spacings used in the communications system. In other words, the length of the reference blank symbol may be determined by the first subcarrier spacing or a system parameter associated with the first subcarrier spacing.

In this embodiment, a manner of obtaining the length of the reference blank symbol by the terminal is not limited. For example, the terminal may calculate the length of the reference blank symbol based on the first subcarrier spacing; may calculate the length of the reference blank symbol based on the system parameter associated with the first subcarrier spacing; or may receive the length of the reference blank symbol, sent by using higher layer signaling.

S102. The terminal sets, based on the length of the reference blank symbol and time domain information of the reference blank symbol, a blank symbol for a subcarrier corresponding to a second subcarrier spacing in a plurality of subcarrier spacings.

Specifically, after obtaining the length of the reference blank symbol, the terminal may set, based on the length of the reference blank symbol and the time domain information of the reference blank symbol, the blank symbol for the subcarrier corresponding to the second subcarrier spacing. That is, the terminal sets a blank symbol for a subcarrier used by the terminal. A smaller subcarrier spacing is corresponding to a longer symbol length, and there is a multiple relationship between symbol lengths corresponding to various subcarrier spacings. Therefore, the length of the reference blank symbol, determined based on the minimum subcarrier spacing used in the communications system, is greater than or equal to a symbol length corresponding to another subcarrier spacing in the communications system. In other words, the length of the reference symbol is equal to a length of one or more symbols corresponding to the another subcarrier spacing. In this way, when setting, based on the length of the reference symbol, a blank symbol in a subframe corresponding to the subcarrier used by the terminal, the terminal may set one or more complete symbols as blank symbols. This avoids a case in which a symbol cannot work normally because a part of the symbol is set as a blank symbol, thereby improving spectral efficiency of the system.

The time domain information of the reference blank symbol is used by the terminal to determine a time domain location of the set blank symbol. Optionally, the time domain information of the reference blank symbol may be used to indicate a location of the reference blank symbol in a subframe corresponding to a reference subcarrier, and the reference subcarrier is a subcarrier corresponding to the first subcarrier spacing. In this way, the terminal may determine a location of the reference blank symbol in a subframe corresponding to the second subcarrier spacing, based on a correspondence between a symbol and a subframe of the subcarrier spacing in which the terminal is located (that is, the second subcarrier spacing), a correspondence between a symbol and a subframe of the first subcarrier spacing, and the location of the reference blank symbol in the subframe corresponding to the reference subcarrier (that is, the time domain information of the reference blank symbol). After determining the location of the reference blank symbol in the subframe corresponding to the second subcarrier spacing, the terminal may set, as the blank symbol based on the length of the reference blank symbol, a symbol that is corresponding to the location of the reference blank symbol and that is in the subframe corresponding to the subcarrier used by the terminal. For how the terminal sets the blank symbol, refer to the prior art. For example, the terminal may use a discontinuous transmission manner and pause data transmission in a symbol, to turn the symbol into a blank symbol. Optionally, the time domain information of the reference blank symbol may be further used to indicate a location of the reference blank symbol in a subframe corresponding to the subcarrier of the second subcarrier spacing. In this way, the terminal may directly set, as the blank symbol based on the length of the reference blank symbol, the symbol that is corresponding to the location of the reference blank symbol and that is in the subframe corresponding to the subcarrier used by the terminal.

Optionally, if the subcarrier spacings in the foregoing communications system are corresponding to different subframe lengths, there may not be an integer multiple relationship between symbol lengths corresponding to the subcarrier spacings. In this case, when the time domain information of the reference blank symbol is used to indicate the location of the reference blank symbol in the subframe corresponding to the reference subcarrier, the time domain information may be time domain information of a plurality of consecutive reference blank symbols, so that when setting, based on the time domain information and the length of the reference symbol, a blank symbol on a subcarrier used by any terminal in the communications system, the terminal sets one or more complete symbols as blank symbols. This avoids a case in which a symbol cannot work normally because a part of the symbol is set as a blank symbol, thereby improving spectral efficiency of the system.

It should be noted that if the terminal sets, as blank symbols based on the length of the reference blank symbol and the time domain information of the reference blank symbol, one or more symbols in the subframe corresponding to the subcarrier used by the terminal, symbols in which a synchronization channel, a broadcast channel, and a beam reference signal (Beam Reference Signaling, BRS) are located may not be set as blank symbols. Optionally, if the terminal sets, as blank symbols, a plurality of symbols in the subframe corresponding to the subcarrier used by the terminal, the plurality of symbols may be consecutive symbols.

According to the method for setting a symbol provided in this embodiment of this application, in the communications system using the plurality of subcarrier spacings, after obtaining the length that is of the reference blank symbol and that is associated with the minimum subcarrier spacing in the plurality of subcarrier spacings, the terminal may set, based on the length of the reference blank symbol and the time domain information of the reference blank symbol, a blank symbol for a subcarrier corresponding to another subcarrier spacing in the plurality of subcarrier spacings. In this way, when setting, based on the length of the reference symbol, the blank symbol in the subframe corresponding to the subcarrier used by the terminal, the terminal may set one or more complete symbols as blank symbols. This avoids a case in which a symbol cannot work normally because a part of the symbol is set as a blank symbol, thereby improving spectral efficiency of the system.

Further, based on the foregoing embodiment, this embodiment describes a specific process in which the terminal obtains the length of the reference blank symbol, and S101 may include the following several cases:

In a first case, the length of the reference blank symbol is obtained based on a preset reference subcarrier spacing.

Specifically, when the reference subcarrier spacing (that is, reference numerology) is preset in the foregoing communications system, and the reference subcarrier spacing is the minimum subcarrier spacing (that is, the first subcarrier spacing) in the plurality of subcarrier spacings used in the communications system, the terminal may obtain the length of the reference blank symbol directly based on the preset reference subcarrier spacing.

During specific implementation, the terminal may use, as the length of the reference blank symbol, duration corresponding to a sum of "a derivative of the reference subcarrier spacing" and "a cyclic prefix corresponding to a symbol of the reference subcarrier spacing". The terminal may alternatively use duration of a mini slot corresponding to the reference subcarrier spacing as the length of the reference blank symbol. The terminal may alternatively obtain the length of the reference blank symbol based on the reference subcarrier spacing by using an existing technical means, or the like. Details are not described herein.

In a second case, the length of the reference blank symbol is obtained based on length information of the reference blank symbol.

Specifically, the length information of the reference blank symbol may carry any information that can be used to obtain the length of the reference blank symbol. For example, the length information of the reference blank symbol may include a subcarrier spacing set including the plurality of subcarrier spacings used in the communications system, a mini slot set including mini slots corresponding to all the subcarrier spacings used in the communications system, the length of the reference blank symbol, a subcarrier spacing corresponding to the reference blank symbol, a mini slot corresponding to the reference blank symbol, and the like. In this embodiment, the length information of the reference blank symbol may be sent by a base station to the terminal. During specific implementation, the base station may send the length information of the reference blank symbol to the terminal by using existing common configuration signaling, for example, master information block (Master Information Block, MIB) signaling or system information block (System Information Blocks, SIB) signaling. The base station may alternatively send the length information of the reference blank symbol to the terminal by using existing dedicated signaling, for example, Radio Resource Control (Radio Resource Control, RRC) signaling. The base station may alternatively send the length information of the reference blank symbol to the terminal by using a separate message. Certainly, the base station may alternatively indicate the length information of the reference blank symbol to the terminal in another manner. Any manner in which the terminal can learn of the length information of the reference blank symbol shall fall within the protection scope of the embodiments of this application.

For example, if the length information of the reference blank symbol includes the subcarrier spacing set including the plurality of subcarrier spacings used in the communications system, then the terminal may obtain the length of the reference blank symbol based on the minimum subcarrier spacing in the subcarrier spacing set (that is, the first subcarrier spacing). During specific implementation, the terminal may use, as the length of the reference blank symbol, duration corresponding to a sum of "a derivative of the first subcarrier spacing" and "a cyclic prefix corresponding to a symbol of the first subcarrier spacing". For example, assuming that the subcarrier spacing set included in the length information of the reference blank symbol is {15 kHz, 30 kHz, 60 kHz}, the length of the reference blank symbol, determined by the terminal based on the subcarrier spacing set, may be a sum of $1/15$ k and a cyclic prefix corresponding to a symbol of the 15 kHz subcarrier spacing. Certainly, the terminal may alternatively obtain the length of the reference blank symbol based on the first subcarrier spacing by using an existing technical means, or the like. Details are not described herein.

For example, if the length information of the reference blank symbol includes the mini slot set including the mini slots corresponding to the subcarrier spacings used in the communications system, then the terminal may obtain the length of the reference blank symbol based on a maximum mini slot in the mini slot set. The maximum mini slot in the mini slot set is a mini slot corresponding to the minimum subcarrier spacing, that is, a mini slot corresponding to the first subcarrier spacing. During specific implementation, the terminal may use duration corresponding to a first mini slot as the length of the reference blank symbol. For example, assuming that the mini slot set included in the length information of the reference blank symbol is {33.34 us, 16.67 us, 8.33 us}, the length of the reference blank symbol, determined by the terminal based on the mini slot set, may be 33.34 us. Certainly, the terminal may alternatively obtain the length of the reference blank symbol based on the first mini slot by using an existing technical means, or the like. Details are not described herein. Optionally, if the mini slot set included in the length information of the reference blank symbol includes only one fixed mini slot, when receiving such a minim slot set, the terminal may use duration corresponding to the fixed mini slot as the length of the reference blank symbol.

If the length information of the reference blank symbol includes the length of the reference blank symbol, the terminal may obtain the length of the reference blank symbol directly based on the length information of the reference blank symbol. The length of the reference blank symbol may be specific duration. For example, if the length information of the reference blank symbol includes 33.34 us, the terminal may directly use 33.34 us as the length of the reference blank symbol. Optionally, if the length information of the reference blank symbol is sent by the base station to the terminal by using dedicated signaling, the length of the reference blank symbol, included in the length information of the reference blank symbol, may be a quantity of "symbols in the subframe corresponding to the subcarrier used by the terminal", included in the reference blank symbol. For example, if the length information of the reference blank symbol includes 3, the terminal may use, as the length of the reference blank symbol, a product of the number and a symbol length of the subframe corresponding to the subcarrier used by the terminal.

If the length information of the reference blank symbol includes the subcarrier spacing corresponding to the reference blank symbol, the terminal may use, as the length of the reference blank symbol, duration corresponding to a sum of "a derivative of the subcarrier spacing corresponding to the reference blank symbol" and "a cyclic prefix corresponding to a symbol of the subcarrier spacing". Certainly, the terminal may alternatively obtain, by using an existing technical means, the length of the reference blank symbol based on the subcarrier spacing corresponding to reference blank symbol, or the like. Details are not described herein.

If the length information of the reference blank symbol includes the mini slot corresponding to the reference blank symbol, the terminal may use duration of the mini slot corresponding to the reference blank symbol as the length of the reference blank symbol. Certainly, the terminal may alternatively obtain, by using an existing technical means, the length of the reference blank symbol based on the mini slot corresponding to reference blank symbol, or the like. Details are not described herein.

Optionally, in another implementation of this application, in addition to the foregoing information, the length information of the reference blank symbol may further include frequency domain information of the reference blank symbol. The frequency domain information of the reference blank symbol is used to indicate, to the terminal, a frequency band on which a blank symbol may be set on a subcarrier in the communications system. In this way, after receiving the length information of the reference blank symbol, the terminal may determine, based on the frequency domain information carried in the length information, whether the subcarrier used by the terminal is within a frequency domain range included in the frequency domain information. If the subcarrier used by the terminal is within the frequency domain range included in the frequency domain information, the terminal obtains the length of the reference blank symbol based on the length information of the reference blank symbol, and further sets, based on the length of the reference blank symbol and the time domain information of the reference blank symbol, the blank symbol on the subcarrier used by the terminal. If the subcarrier used by the terminal is not within the frequency domain range included in the frequency domain information, the terminal does not set the blank symbol based on the received length information of the reference blank symbol. In this manner, the blank symbol can be set more flexibly, and the foregoing symbol setting manner is applicable to more extensive scenarios.

According to the method for setting a symbol provided in this embodiment of this application, in the communications system using the plurality of subcarrier spacings, the terminal may obtain the length that is of the reference blank symbol and that is associated with the minimum subcarrier spacing in the plurality of subcarrier spacings, so that the terminal can set, based on the length of the reference blank symbol and the time domain information of the reference blank symbol, a blank symbol for a subcarrier corresponding to another subcarrier spacing in the plurality of subcarrier spacings. In this way, when setting, based on the length of the reference symbol, the blank symbol in the subframe corresponding to the subcarrier used by the terminal, the terminal may set one or more complete symbols as blank symbols. This avoids a case in which a symbol cannot work normally because a part of the symbol is set as a blank symbol, thereby improving spectral efficiency of the system.

As described in the foregoing embodiment, the time domain information of the reference blank symbol may be used to indicate the location of the reference blank symbol in the subframe corresponding to the reference subcarrier, and may be further used to indicate the location of the reference blank symbol in the subframe corresponding to the subcarrier of the second subcarrier spacing. Further, based on the foregoing embodiment, when the time domain information of the reference blank symbol is used to indicate the location of the reference blank symbol in the subframe corresponding to the reference subcarrier, the time domain information of the reference blank symbol may include first time domain information, or first time domain information and second time domain information.

The first time domain information includes a number of the reference blank symbol, that is, a symbol number of the reference blank symbol in the subframe corresponding to the reference subcarrier. The second time domain information includes a subframe number of the reference blank symbol (that is, a subframe number of the reference blank symbol in the subframe corresponding to the reference subcarrier), and/or a frame number of the reference blank symbol (that is, a frame number of the reference blank symbol in a frame corresponding to the reference subcarrier, where one frame may include at least one subframe). It should be noted that representation forms of the first time domain information and the second time domain information are not limited in this embodiment, provided that the number of the reference blank symbol, the subframe number of the reference blank symbol, and the frame number of the reference blank symbol can be correctly represented. For example, an explicit representation form or an implicit representation form may be used.

Optionally, if the time domain information of the reference blank symbol includes the number of the reference blank symbol (that is, the first time domain information), the terminal may set, based on the preset time domain information of the reference blank symbol and the length of the reference blank symbol, a blank symbol in each subframe corresponding to the subcarrier used by the terminal, that is, set a blank symbol in each subframe.

Optionally, if the time domain information of the reference blank symbol includes the number of the reference blank symbol (that is, the first time domain information) and the subframe number of the reference blank symbol (that is, the second time domain information), the terminal may set, based on the length of the reference blank symbol, a blank symbol in a subframe that is corresponding to the subframe number of the reference blank symbol and that is on the subcarrier used by the terminal, that is, set a blank symbol in a subframe whose subframe number is the same as that of the reference blank symbol.

Optionally, if the time domain information of the reference blank symbol includes the number of the reference blank symbol (that is, the first time domain information) and the frame number of the reference blank symbol (that is, the second time domain information), the terminal may set, based on the length of the reference blank symbol and the number of the reference blank symbol, a blank symbol in each subframe of a frame that is corresponding to the frame number of the reference blank symbol and that is on the subcarrier used by the terminal, that is, set a blank symbol in each subframe whose frame number is the same as that of the reference blank symbol.

Optionally, if the time domain information of the reference blank symbol includes the number of the reference blank symbol (that is, the first time domain information), the subframe number of the reference blank symbol, and the frame number of the reference blank symbol (that is, the second time domain information), the terminal may select, in a frame that is corresponding to the frame number of the reference blank symbol and that is on the subcarrier used by the terminal, a subframe whose number is the same as the subframe number of the reference blank symbol, and set a blank symbol in the subframe based on the length of the reference blank symbol and the number of the reference blank symbol, that is, in a frame whose number is the same as the frame number of the reference blank symbol, set a blank symbol in a subframe whose number is the same as the subframe number of the reference blank symbol.

It should be noted that the time domain information of the reference blank symbol may be time domain information preset on the terminal, or may be time domain information sent by the base station to the terminal. Optionally, the time domain information of the reference blank symbol may further include the first time domain information preset on the terminal, and the second time domain information sent by the base station to the terminal; the second time domain information preset on the terminal, and the first time domain information sent by the base station to the terminal; or the like. If the time domain information of the reference blank symbol is sent by the base station to the terminal, the time domain information of the reference blank symbol and the length information of the reference blank symbol described in the foregoing embodiment may be carried in same signaling and sent to the terminal, or may be carried in different signaling and sent to the terminal. This is not limited in this application.

Based on the foregoing listed information included in the time domain information of the reference blank symbol, the terminal can use a plurality of manners to set, based on the time domain information of the reference blank symbol and the length of the reference blank symbol, the blank symbol for the subcarrier used by the terminal. This increases flexibility of setting a symbol by the terminal, so that the foregoing symbol setting manner is applicable to more extensive scenarios, further improving spectral efficiency of the system.

Figure 3:
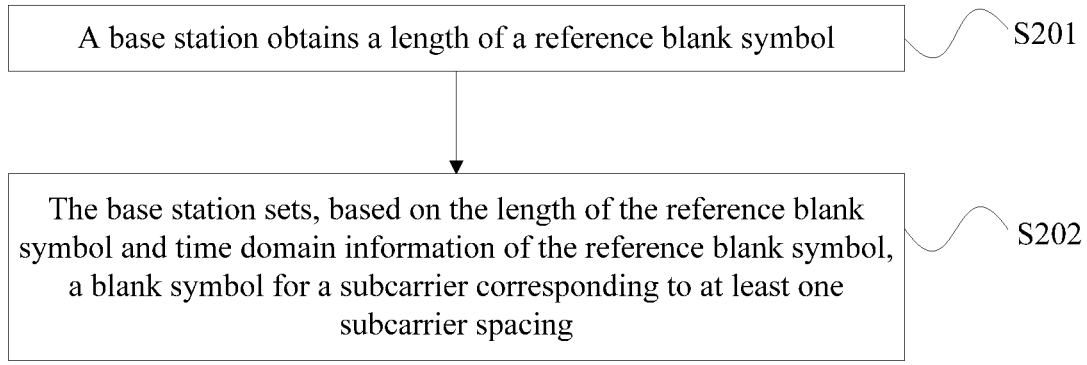
FIG. 3 is a schematic flowchart of another method for setting a symbol according to an embodiment of this application.

FIG. 3 is a schematic flowchart of another method for setting a symbol according to an embodiment of this application. This embodiment relates to a specific process in which a base station sets, based on an obtained length of a reference blank symbol and time domain information of the reference blank symbol, a blank symbol for a subcarrier corresponding to at least one subcarrier spacing. As shown in FIG. 3, the method includes the following steps.

S201. A base station obtains a length of a reference blank symbol.

Specifically, the base station may be a base station in "a communications system using a plurality of subcarrier spacings". A manner of obtaining the length of the reference blank symbol by the base station is similar to a manner of obtaining the length of the reference blank symbol by a terminal. Details are not described herein again.

S202. The base station sets, based on the length of the reference blank symbol and time domain information of the reference blank symbol, a blank symbol for a subcarrier corresponding to at least one subcarrier spacing.

Specifically, after obtaining the length of the reference blank symbol, the base station may set, based on the length of the reference blank symbol and the time domain information of the reference blank symbol, the blank symbol for the subcarrier corresponding to the at least one subcarrier spacing. In other words, the base station sets a blank symbol for a subcarrier corresponding to one or more subcarrier spacings in the communications system. A smaller subcarrier spacing is corresponding to a longer symbol length, and there is a multiple relationship between symbol lengths corresponding to various subcarrier spacings. Therefore, the length of the reference blank symbol, determined based on a minimum subcarrier spacing used in the communications system, is greater than or equal to a symbol length corresponding to another subcarrier spacing in the communications system. In other words, the length of the reference symbol is equal to a length of one or more symbols corresponding to the another subcarrier spacing. In this case, when setting, based on the length of the reference symbol, a blank symbol in a subframe corresponding to the subcarrier of the one or more subcarrier spacings used in the communications system, the base station may set, as blank symbols, one or more complete symbols in a subframe corresponding to a subcarrier of a subcarrier spacing. This avoids a case in which a symbol cannot work normally because a part of the symbol is set as a blank symbol, thereby improving spectral efficiency of the system.

The time domain information of the reference blank symbol is used by the terminal to determine a time domain location of the set blank symbol. Optionally, the time domain information of the reference blank symbol may be used to indicate a location of the reference blank symbol in a subframe corresponding to a reference subcarrier, and the reference subcarrier is a subcarrier corresponding to a first subcarrier spacing. In this way, the base station may determine a location of the reference blank symbol in a subframe corresponding to the subcarrier spacing, based on a correspondence between a symbol and a subframe of each subcarrier spacing in the at least one subcarrier spacing, a correspondence between a symbol and a subframe of the first subcarrier spacing, and the location of the reference blank symbol in the subframe corresponding to the reference subcarrier (that is, the time domain information of the reference blank symbol). After determining the location of the reference blank symbol in the subframe corresponding to the subcarrier spacing, the base station may set, as the blank symbol based on the length of the reference blank symbol, a symbol that is corresponding to the location of the reference blank symbol and that is in a subframe corresponding to a subcarrier of the subcarrier spacing. For how the base station sets the blank symbol, refer to the prior art. For example, the base station may use a discontinuous transmission manner and pause data transmission in a symbol, to turn the symbol into a blank symbol. Optionally, the time domain information of the reference blank symbol may be further used to indicate a location of the reference blank symbol in a subframe corresponding to each subcarrier spacing in the at least one subcarrier spacing. In this way, based on the length of the reference blank symbol, and the location of the reference blank symbol in the subframe corresponding to each subcarrier spacing in the at least one subcarrier spacing, the base station may directly set, as the blank symbol, a symbol that is corresponding to the location of the reference blank symbol and that is in a subframe corresponding to a subcarrier of the subcarrier spacing.

Optionally, if the subcarrier spacings in the foregoing communications system are corresponding to different subframe lengths, there may not be an integer multiple relationship between symbol lengths corresponding to the subcarrier spacings. In this case, when the time domain information of the reference blank symbol is used to indicate the location of the reference blank symbol in the subframe corresponding to the reference subcarrier, the time domain information may be time domain information of a plurality of consecutive reference blank symbols, so that when setting, based on the time domain information and the length of the reference symbol, a blank symbol on a subcarrier of a subcarrier spacing, the base station sets one or more complete symbols as blank symbols. This avoids a case in which a symbol cannot work normally because a part of the symbol is set as a blank symbol, thereby improving spectral efficiency of the system.

It should be noted that if the base station sets, as blank symbols based on the length of the reference blank symbol and the time domain information of the reference blank symbol, one or more symbols in a subframe corresponding to a subcarrier of each subcarrier spacing in the at least one subcarrier spacing, symbols in which a synchronization channel, a broadcast channel, and a BRS are located may not be set as blank symbols. Optionally, if the base station sets, as blank symbols, a plurality of symbols in the subframe corresponding to the subcarrier of each subcarrier spacing in the at least one subcarrier spacing, the plurality of symbols may be consecutive symbols.

According to the method for setting a symbol provided in this embodiment of this application, in the communications system using the plurality of subcarrier spacings, after obtaining the length that is of the reference blank symbol and that is associated with the minimum subcarrier spacing in the plurality of subcarrier spacings, the base station may set, based on the length of the reference blank symbol and the time domain information of the reference blank symbol, the blank symbol for the subcarrier of the one or more subcarrier spacings used in the communications system. In this way, when setting, based on the length of the reference symbol, a blank symbol in a subframe corresponding to the subcarrier of the one or more subcarrier spacings used in the communications system, the base station may set one or more complete symbols as blank symbols. This avoids a case in which a symbol cannot work normally because a part of the symbol is set as a blank symbol, thereby improving spectral efficiency of the system.

Further, based on the foregoing embodiment, this embodiment describes a specific process in which the base station obtains the length of the reference blank symbol, and S201 may include the following several cases:

In a first case, the length of the reference blank symbol is obtained based on a preset reference subcarrier spacing.

A manner of obtaining the length of the reference blank symbol by the base station based on the preset reference subcarrier spacing is similar to a manner of obtaining the length of the reference blank symbol by the terminal based on the preset reference subcarrier spacing. Details are not described herein again.

In a second case, the length of the reference blank symbol is obtained based on length information of the reference blank symbol.

Specifically, the length information of the reference blank symbol may carry any information that can be used to obtain the length of the reference blank symbol. For example, the length information of the reference blank symbol may include a subcarrier spacing set including the plurality of subcarrier spacings used in the communications system, a mini slot set including mini slots corresponding to all the subcarrier spacings used in the communications system, the length of the reference blank symbol, a subcarrier spacing corresponding to the reference blank symbol, a mini slot corresponding to the reference blank symbol, and the like. In this embodiment, when the length information of the reference blank symbol includes the length of the reference blank symbol, the subcarrier spacing corresponding to the reference blank symbol, the mini slot corresponding to the reference blank symbol, and the like, the length information of the reference blank symbol may be sent to the base station by a higher layer or may be preset on the base station. The higher layer described herein may be an upper layer device of the base station, for example, a core network device.

A manner of obtaining the length of the reference blank symbol by the base station based on the length information of the reference blank symbol is similar to a manner of obtaining the length of the reference blank symbol by the terminal based on the length information of the reference blank symbol. Details are not described herein again.

Optionally, if the length information of the reference blank symbol is sent to the base station by the higher layer, in addition to the foregoing information, the length information of the reference blank symbol may further include frequency domain information of the reference blank symbol. The frequency domain information of the reference blank symbol is used to indicate, to the base station, a frequency band on which a blank symbol may be set on a subcarrier in the communications system. In this way, after receiving the length information of the reference blank symbol, the base station may set, based on the frequency domain information carried in the length information, a blank symbol for a subcarrier of a subcarrier spacing within the frequency domain range. In this manner, the blank symbol can be set more flexibly, and the foregoing symbol setting manner is applicable to more extensive scenarios.

According to the method for setting a symbol provided in this embodiment of this application, in the communications system using the plurality of subcarrier spacings, after obtaining the length that is of the reference blank symbol and that is associated with the minimum subcarrier spacing in the plurality of subcarrier spacings, the base station may set, based on the length of the reference blank symbol and the time domain information of the reference blank symbol, the blank symbol for the subcarrier of the one or more subcarrier spacings used in the communications system. In this way, when setting, based on the length of the reference symbol, a blank symbol in a subframe corresponding to the subcarrier of the one or more subcarrier spacings used in the communications system, the base station may set one or more complete symbols as blank symbols. This avoids a case in which a symbol cannot work normally because a part of the symbol is set as a blank symbol, thereby improving spectral efficiency of the system.

As described in the foregoing embodiment, the time domain information of the reference blank symbol may be used to indicate the location of the reference blank symbol in the subframe corresponding to the reference subcarrier, and may be further used to indicate a location of the reference blank symbol in a subframe corresponding to a subcarrier of a second subcarrier spacing. Further, based on the foregoing embodiment, when the time domain information of the reference blank symbol is used to indicate the location of the reference blank symbol in the subframe corresponding to the reference subcarrier, the time domain information of the reference blank symbol may include first time domain information, or first time domain information and second time domain information.

The first time domain information includes a number of the reference blank symbol, that is, a symbol number of the reference blank symbol in the subframe corresponding to the reference subcarrier. The second time domain information includes a subframe number of the reference blank symbol (that is, a subframe number of the reference blank symbol in the subframe corresponding to the reference subcarrier), and/or a frame number of the reference blank symbol (that is, a frame number of the reference blank symbol in a frame corresponding to the reference subcarrier, where one frame may include at least one subframe). It should be noted that representation forms of the first time domain information and the second time domain information are not limited in this embodiment, provided that the number of the reference blank symbol, the subframe number of the reference blank symbol, and the frame number of the reference blank symbol can be correctly represented. For example, an explicit representation form or an implicit representation form may be used.

It should be noted that, for details about how the base station sets, based on the time domain information of the reference blank symbol, the blank symbol for the subcarrier corresponding to the at least one subcarrier spacing, reference may be made to how the terminal sets, based on the time domain information of the reference blank symbol, the blank symbol for the subcarrier used by the terminal. Implementation principles thereof are similar, and details are not described herein again.

It should be noted that the time domain information of the reference blank symbol may be time domain information preset on the base station, may be time domain information sent by the higher layer to the base station, may be time domain information determined by the base station based on use of system resources, or the like. Optionally, the time domain information of the reference blank symbol may further include the first time domain information preset on the base station, and the second time domain information sent by the higher layer to the base station; the second time domain information preset on the base station, and the first time domain information sent by the higher layer to the base station; or the like. If the time domain information of the reference blank symbol is sent by the higher layer to the base station, the time domain information of the reference blank symbol and the length information of the reference blank symbol described in the foregoing embodiment may be carried in same signaling and sent to the base station, or may be carried in different signaling and sent to the base station. This is not limited in this application.

Based on the foregoing listed information included in the time domain information of the reference blank symbol, the base station can use a plurality of manners to set, based on the time domain information of the reference blank symbol and the length of the reference blank symbol, the blank symbol for the subcarrier corresponding to the at least one subcarrier spacing. This increases flexibility of setting a symbol by the base station, so that the foregoing symbol setting manner is applicable to more extensive scenarios, further improving spectral efficiency of the system.

Further, based on the foregoing embodiment, this embodiment describes a specific process in which the base station sets, based on the length of the reference blank symbol and the time domain information of the reference blank symbol, the blank symbol for the subcarrier corresponding to the at least one subcarrier spacing, and S202 may include the following two cases:

In a first case, the base station sets, based on the length of the reference blank symbol and the time domain information of the reference blank symbol, a blank symbol for a subcarrier corresponding to each subcarrier spacing.

Specifically, in this embodiment, after obtaining the length of the reference blank symbol, the base station may set, based on the length of the reference blank symbol and the time domain information of the reference blank symbol, the blank symbol for the subcarrier corresponding to each subcarrier spacing used in the communications system. In other words, the base station sets a blank symbol in a subframe corresponding to the subcarrier of each subcarrier spacing in the communications system.

In a second case, the base station sets, based on the length of the reference blank symbol and the time domain information of the reference blank symbol, a blank symbol for the subcarrier corresponding to the first subcarrier spacing, and sets a subband width corresponding to the first subcarrier spacing to full bandwidth.

Specifically, in this embodiment, after obtaining the length of the reference blank symbol, the base station may set, based on the length of the reference blank symbol and the time domain information of the reference blank symbol, a blank symbol in a subframe corresponding to the subcarrier of the first subcarrier spacing. In addition, the base station may further set a subband width corresponding to the subframe to the full bandwidth, that is, modify each subcarrier spacing of the entire bandwidth within a length of a blank symbol to the first subcarrier spacing. This blank symbol setting manner may be applicable to a scenario in which bandwidth corresponding to each subcarrier spacing in the communications system cannot satisfy minimum bandwidth of a blank symbol required in an electromagnetic perception scenario. In this manner, a blank symbol whose bandwidth is modified to the full bandwidth may be applicable to the electromagnetic perception scenario. This increases flexibility of setting a symbol by the base station, so that the foregoing symbol setting manner is applicable to more extensive scenarios, further improving spectral efficiency of the system.

According to the method for setting a symbol provided in this embodiment of this application, in the communications system using the plurality of subcarrier spacings, after obtaining the length that is of the reference blank symbol and that is associated with the minimum subcarrier spacing in the plurality of subcarrier spacings, the base station may set, based on the length of the reference blank symbol and the time domain information of the reference blank symbol, the blank symbol for the subcarrier of the one or more subcarrier spacings used in the communications system. In this way, when setting, based on the length of the reference symbol, a blank symbol in a subframe corresponding to the subcarrier of the one or more subcarrier spacings used in communications system, the base station may set one or more complete symbols as blank symbols. This avoids a case in which a symbol cannot work normally because a part of the symbol is set as a blank symbol, thereby improving spectral efficiency of the system.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Figure 4:
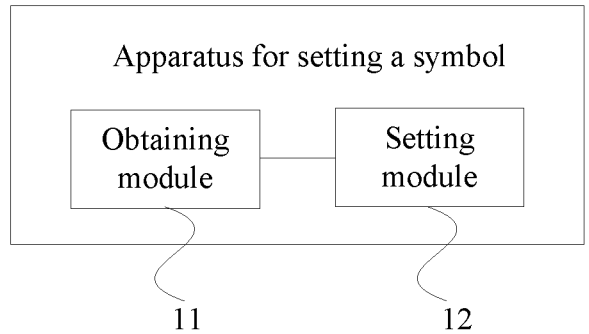
FIG. 4 is a schematic structural diagram of an apparatus for setting a symbol according to an embodiment of this application.

FIG. 4 is a schematic structural diagram of an apparatus for setting a symbol according to an embodiment of this application. The apparatus may be located in a terminal, and used in a communications system that uses a plurality of subcarrier spacings. Referring to FIG. 4, the apparatus includes an obtaining module 11 and a setting module 12.

The obtaining module 11 is configured to obtain a length of a reference blank symbol, where the length of the reference blank symbol is associated with a first subcarrier spacing, and the first subcarrier spacing is a minimum subcarrier spacing in the plurality of subcarrier spacings.

The setting module 12 is configured to set, based on the length of the reference blank symbol and time domain information of the reference blank symbol, a blank symbol for a subcarrier corresponding to a second subcarrier spacing in the plurality of subcarrier spacings.

Optionally, the time domain information of the reference blank symbol is used to indicate a location of the reference blank symbol in a subframe corresponding to a reference subcarrier, and the reference subcarrier is a subcarrier corresponding to the first subcarrier spacing. For example, the time domain information of the reference blank symbol may include first time domain information; or the time domain information of the reference blank symbol includes first time domain information and second time domain information. The first time domain information includes a symbol number of the reference blank symbol, and the second time domain information includes a subframe number of the reference blank symbol and/or a frame number of the reference blank symbol.

Optionally, the obtaining module 11 is specifically configured to: obtain the length of the reference blank symbol based on a preset reference subcarrier spacing, where the reference subcarrier spacing is the first subcarrier spacing; or obtain the length of the reference blank symbol based on length information of the reference blank symbol.

In an implementation of this application, the length information of the reference blank symbol includes a subcarrier spacing set including the plurality of subcarrier spacings; and that the obtaining module 11 is configured to obtain the length of the reference blank symbol based on length information of the reference blank symbol may be specifically: the obtaining module 11 obtains the length of the reference blank symbol based on the first subcarrier spacing in the subcarrier spacing set. During specific implementation, the obtaining module 11 may use, as the length of the reference blank symbol, duration corresponding to a sum of a derivative and a cyclic prefix that are of the first subcarrier spacing.

In an implementation of this application, the length information of the reference blank symbol includes a mini slot set including mini slots corresponding to the plurality of subcarrier spacings; and that the obtaining module 11 is configured to obtain the length of the reference blank symbol based on length information of the reference blank symbol may be specifically: the obtaining module 11 obtains the length of the reference blank symbol based on a first mini slot in the mini slot set, where the first mini slot is a maximum mini slot in the mini slot set, and the first mini slot is a mini slot corresponding to the first subcarrier spacing. During specific implementation, the obtaining module 11 may use duration corresponding to the first mini slot as the length of the reference blank symbol.

In an implementation of this application, the length information of the reference blank symbol includes any one of the following: a subcarrier spacing corresponding to the reference blank symbol, the length of the reference blank symbol, and a mini slot corresponding to the reference blank symbol. In an implementation of this application, the length information of the reference blank symbol may further include frequency domain information of the reference blank symbol.

The apparatus may be configured to perform the method provided in the foregoing method embodiments. Specific implementations and technical effects are similar to those of the method embodiments, and details are not described herein again.

Figure 5:
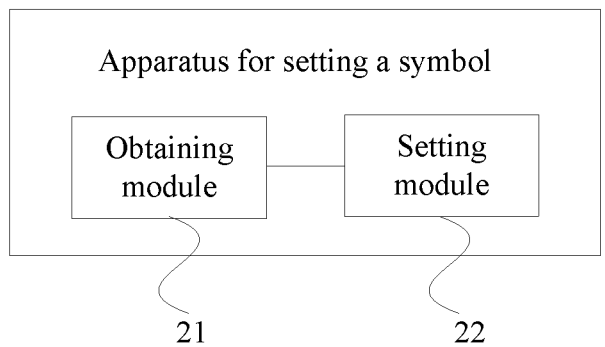
FIG. 5 is a schematic structural diagram of another apparatus for setting a symbol according to an embodiment of this application.

FIG. 5 is a schematic structural diagram of another apparatus for setting a symbol according to an embodiment of this application. The apparatus may be located in a base station, and used in a communications system that uses a plurality of subcarrier spacings. Referring to FIG. 5, the apparatus includes an obtaining module 21 and a setting module 22.

The obtaining module 21 is configured to obtain a length of a reference blank symbol, where the length of the reference blank symbol is associated with a first subcarrier spacing, and the first subcarrier spacing is a minimum subcarrier spacing in the plurality of subcarrier spacings.

The setting module 22 is configured to set, based on the length of the reference blank symbol and time domain information of the reference blank symbol, a blank symbol for a subcarrier corresponding to at least one subcarrier spacing.

Optionally, the time domain information of the reference blank symbol is used to indicate a location of the reference blank symbol in a subframe corresponding to a reference subcarrier, and the reference subcarrier is a subcarrier corresponding to the first subcarrier spacing. For example, the time domain information of the reference blank symbol may include first time domain information; or the time domain information of the reference blank symbol includes first time domain information and second time domain information. The first time domain information includes a symbol number of the reference blank symbol, and the second time domain information includes a subframe number of the reference blank symbol and/or a frame number of the reference blank symbol.

In this implementation, the setting module 22 is specifically configured to set, based on the length of the reference blank symbol and the time domain information of the reference blank symbol, a blank symbol for a subcarrier corresponding to each subcarrier spacing; or the setting module 22 is specifically configured to set, based on the length of the reference blank symbol and the time domain information of the reference blank symbol, a blank symbol for the subcarrier corresponding to the first subcarrier spacing, and set a subband width corresponding to the first subcarrier spacing to full bandwidth.

Optionally, the obtaining module 21 is specifically configured to: obtain the length of the reference blank symbol based on a preset reference subcarrier spacing, where the reference subcarrier spacing is the first subcarrier spacing; or obtain the length of the reference blank symbol based on length information of the reference blank symbol.

In an implementation of this application, the length information of the reference blank symbol includes a subcarrier spacing set including the plurality of subcarrier spacings; and that the obtaining module 21 is configured to obtain the length of the reference blank symbol based on length information of the reference blank symbol may be specifically: the obtaining module 21 obtains the length of the reference blank symbol based on the first subcarrier spacing in the subcarrier spacing set. During specific implementation, the obtaining module 21 may use, as the length of the reference blank symbol, duration corresponding to a sum of a derivative and a cyclic prefix that are of the first subcarrier spacing.

In an implementation of this application, the length information of the reference blank symbol includes a mini slot set including mini slots corresponding to the plurality of subcarrier spacings; and that the obtaining module 21 is configured to obtain the length of the reference blank symbol based on length information of the reference blank symbol may be specifically: the obtaining module 21 obtains the length of the reference blank symbol based on a first mini slot in the mini slot set, where the first mini slot is a maximum mini slot in the mini slot set, and the first mini slot is a mini slot corresponding to the first subcarrier spacing. During specific implementation, the obtaining module 21 may use duration corresponding to the first mini slot as the length of the reference blank symbol.

In an implementation of this application, the length information of the reference blank symbol includes any one of the following: a subcarrier spacing corresponding to the reference blank symbol, the length of the reference blank symbol, and a mini slot corresponding to the reference blank symbol. In an implementation of this application, the length information of the reference blank symbol may further include frequency domain information of the reference blank symbol.

The apparatus may be configured to perform the method provided in the foregoing method embodiments. Specific implementations and technical effects are similar to those of the method embodiments, and details are not described herein again.

It should be noted that it should be understood that module division of the foregoing apparatuses is merely logical function division. During actual implementation, all or some of the modules may be integrated into one physical entity, or the modules may be physically separated. Moreover, all of these modules may be implemented by invoking software by a processing component; or all of these modules may be implemented by hardware; or some modules are implemented by invoking software by a processing component, and some modules are implemented by hardware. For example, the setting module may be a separately disposed processing component, or may be integrated into a chip of the foregoing apparatus for implementation. In addition, the setting module may alternatively be stored in a memory of the foregoing apparatus in a form of program code, and a processing component of the foregoing apparatus invokes the program code to perform a function of the foregoing determining module. Other modules are implemented in a similar way. In addition, all or some of these modules may be integrated, or these modules may be implemented separately. The processing component described herein may be an integrated circuit, and has a signal processing capability. In an implementation process, steps in the foregoing methods or the foregoing modules can be implemented by using a hardware integrated logical circuit in the processing component, or by using instructions in a form of software.

For example, these modules may be configured as one or more integrated circuits implementing the foregoing methods, for example, one or more application-specific integrated circuits (Application Specific Integrated Circuit, ASIC), one or more microprocessors (digital signal processor, DSP), or one or more field programmable gate arrays (Field Programmable Gate Array, FPGA). For another example, when a module is implemented by scheduling the program code by a processing component, the processing component may be a general-purpose processor, for example, a central processing unit (Central Processing Unit, CPU) or another processor that can invoke the program code. For another example, these modules may be integrated together and implemented in a system-on-a-chip (system-on-a-chip, SOC) form.

Figure 6:
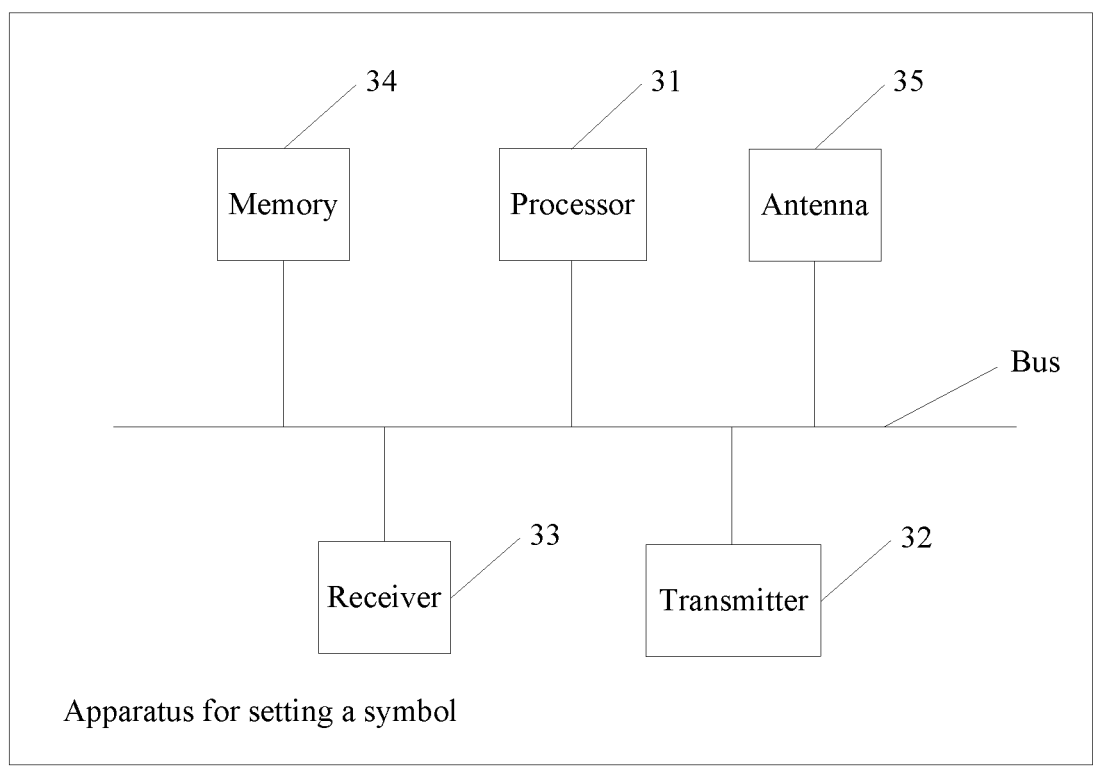
FIG. 6 is a schematic structural diagram of still another apparatus for setting a symbol according to an embodiment of this application.

FIG. 6 is a schematic structural diagram of still another apparatus for setting a symbol according to an embodiment of this application. The apparatus may be located in a terminal, and used in a communications system that uses a plurality of subcarrier spacings. As shown in FIG. 6, the apparatus may include a processor 31, a transmitter 32, a receiver 33, a memory 34, and an antenna 35.

The memory 34, the transmitter 32, the receiver 33, and the processor 31 may be connected by using a bus. Certainly, during actual application, the memory 34, the transmitter 32, the receiver 33, and the processor 31 may be connected by using another structure different from a bus structure, for example, a star structure. This is not specifically limited in this application.

Optionally, the processor 31 may be specifically a general-purpose central processing unit or an ASIC, may be one or more integrated circuits configured to control program execution, may be a hardware circuit developed by using an FPGA, or may be a baseband processor.

Optionally, the processor 31 may include at least one processing core.

Optionally, the memory 34 may include one or more of a ROM, a RAM, and a disk memory. The memory 34 is configured to store data and/or an instruction required for running the processor 31. There may be one or more memories 34.

The processor 31 is configured to execute the instruction stored in the memory 34. When the processor 31 executes the instruction stored in the memory 34, the processor 31 performs the foregoing symbol setting method performed by the terminal. Details are not described herein again.

Figure 7:
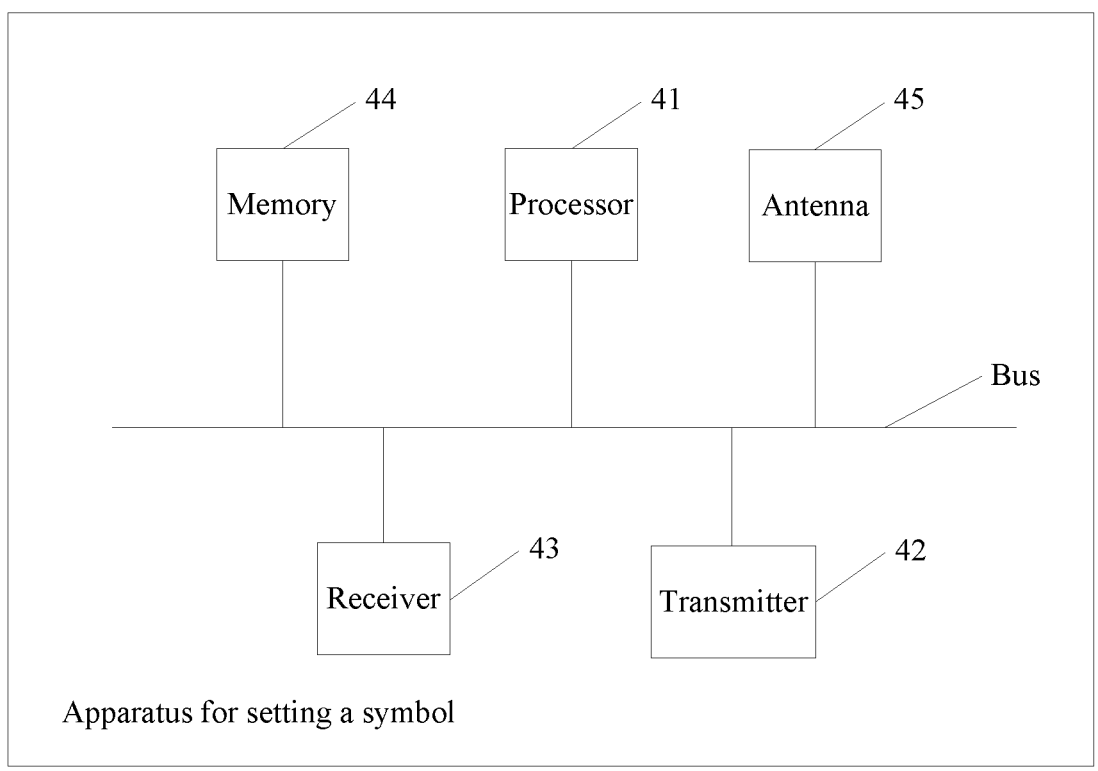
FIG. 7 is a schematic structural diagram of yet another apparatus for setting a symbol according to an embodiment of this application.

FIG. 7 is a schematic structural diagram of yet another apparatus for setting a symbol according to an embodiment of this application. The apparatus may be located in a base station, and used in a communications system that uses a plurality of subcarrier spacings. The apparatus includes a processor 41, a transmitter 42, a receiver 43, a memory 44, and an antenna 45.

The memory 44, the transmitter 42, the receiver 43, and the processor 41 may be connected by using a bus. Certainly, during actual application, the memory 44, the transmitter 42, the receiver 43, and the processor 41 may be connected by using another structure different from a bus structure, for example, a star structure. This is not specifically limited in this application.

Optionally, the processor 41 may be specifically a general-purpose central processing unit or an ASIC, may be one or more integrated circuits configured to control program execution, may be a hardware circuit developed by using an FPGA, or may be a baseband processor.

Optionally, the processor 41 may include at least one processing core.

Optionally, the memory 44 may include one or more of a ROM, a RAM, and a disk memory. The memory 44 is configured to store data and/or an instruction required for running the processor 41. There may be one or more memories 44.

The processor 41 is configured to execute the instruction stored in the memory 44. When the processor 41 executes the instruction stored in the memory 44, the processor 41 performs the foregoing symbol setting method performed by the base station. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. A method for setting a symbol in a communications system that uses a plurality of subcarrier spacings, comprising:
  obtaining, by a base station, a length of a reference blank symbol associated with a first subcarrier spacing, and the first subcarrier spacing is a minimum subcarrier spacing in the plurality of subcarrier spacings; and
  setting, by the base station and based on the length of the reference blank symbol and time domain information of the reference blank symbol, a blank symbol for a subcarrier corresponding to a second subcarrier spacing in the plurality of subcarrier spacings,
  wherein the blank symbol is used, by the base station, to perform a function other than transmission of service data and signaling.

2. The method according to claim 1, wherein the time domain information of the reference blank symbol is used to indicate a location of the reference blank symbol in a subframe corresponding to a reference subcarrier, and the reference subcarrier is a subcarrier corresponding to the first subcarrier spacing.

3. The method according to claim 2, wherein the time domain information of the reference blank symbol comprises first time domain information, or the time domain information of the reference blank symbol comprises the first time domain information and second time domain information; and
  the first time domain information comprises a symbol number of the reference blank symbol, and the second time domain information comprises a subframe number of the reference blank symbol and/or a frame number of the reference blank symbol.

4. The method according to claim 1, wherein the obtaining a length of a reference blank symbol comprises:
  obtaining the length of the reference blank symbol based on a preset reference subcarrier spacing, wherein the preset reference subcarrier spacing is the first subcarrier spacing; or
  obtaining the length of the reference blank symbol based on length information of the reference blank symbol.

5. The method according to claim 4, wherein the length information of the reference blank symbol comprises a subcarrier spacing set comprising the plurality of subcarrier spacings; and
  the obtaining the length of the reference blank symbol based on length information of the reference blank symbol comprises:
    obtaining the length of the reference blank symbol based on the first subcarrier spacing in the subcarrier spacing set.

6. The method according to claim 5, wherein the obtaining the length of the reference blank symbol based on the first subcarrier spacing in the subcarrier spacing set comprises:
  using, as the length of the reference blank symbol, duration corresponding to a sum of a derivative and a cyclic prefix that are of the first subcarrier spacing.

7. The method according to claim 4, wherein the length information of the reference blank symbol comprises a mini slot set comprising mini slots corresponding to the plurality of subcarrier spacings; and
  the obtaining the length of the reference blank symbol based on length information of the reference blank symbol comprises:

obtaining the length of the reference blank symbol based on a first mini slot in the mini slot set, wherein the first mini slot is a maximum mini slot in the mini slot set, and the first mini slot is a mini slot corresponding to the first subcarrier spacing.

8. The method according to claim 7, wherein the obtaining the length of the reference blank symbol based on a first mini slot in the mini slot set comprises:

using duration corresponding to the first mini slot as the length of the reference blank symbol.

9. The method according to claim 4, wherein the length information of the reference blank symbol comprises any one of the following: a subcarrier spacing corresponding to the reference blank symbol, the length of the reference blank symbol, and a mini slot corresponding to the reference blank symbol.

10. A base station for setting a symbol in a communications system that uses a plurality of subcarrier spacings, comprising:

a processor, configured to:
obtain a length of a reference blank symbol, and set, based on the length of the reference blank symbol and time domain information of the reference blank symbol, a blank symbol for a subcarrier corresponding to a second subcarrier spacing in the plurality of subcarrier spacings, wherein
the length of the reference blank symbol is associated with a first subcarrier spacing, and the first subcarrier spacing is a minimum subcarrier spacing in the plurality of subcarrier spacings,
wherein the blank symbol is used, by the base station, to perform a function other than transmission of service data and signaling.

11. The base station according to claim 10, wherein the time domain information of the reference blank symbol is used to indicate a location of the reference blank symbol in a subframe corresponding to a reference subcarrier, and the reference subcarrier is a subcarrier corresponding to the first subcarrier spacing.

12. A base station for setting a symbol in a communications system that uses a plurality of subcarrier spacings, comprising:

a processor, configured to:
obtain a length of a reference blank symbol, and set, based on the length of the reference blank symbol and time domain information of the reference blank symbol, a blank symbol for a subcarrier corresponding to at least one subcarrier spacing, wherein
the length of the reference blank symbol is associated with a first subcarrier spacing, and the first subcarrier spacing is a minimum subcarrier spacing in the plurality of subcarrier spacings,
wherein the blank symbol is used, by the base station, to perform a function other than transmission of service data and signaling.

13. The base station according to claim 12, wherein the time domain information of the reference blank symbol is used to indicate a location of the reference blank symbol in a subframe corresponding to a reference subcarrier, and the reference subcarrier is a subcarrier corresponding to the first subcarrier spacing.

14. The base station according to claim 13, wherein the processor is configured to set, based on the length of the reference blank symbol and the time domain information of the reference blank symbol, a blank symbol for a subcarrier corresponding to each subcarrier spacing; or the processor is configured to set, based on the length of the reference blank symbol and the time domain information of the reference blank symbol, a blank symbol for the subcarrier corresponding to the first subcarrier spacing, and set a subband width corresponding to the first subcarrier spacing to full bandwidth.

15. The base station according to claim 11, wherein the time domain information of the reference blank symbol comprises first time domain information, or the time domain information of the reference blank symbol comprises the first time domain information and second time domain information; and the first time domain information comprises a symbol number of the reference blank symbol, and the second time domain information comprises a subframe number of the reference blank symbol and/or a frame number of the reference blank symbol.

16. The base station according to claim 10, wherein the obtaining a length of a reference blank symbol comprises:

obtaining the length of the reference blank symbol based on a preset reference subcarrier spacing, wherein the preset reference subcarrier spacing is the first subcarrier spacing; or
obtaining the length of the reference blank symbol based on length information of the reference blank symbol.

17. The base station according to claim 16, wherein the length information of the reference blank symbol comprises a subcarrier spacing set comprising the plurality of subcarrier spacings; and the obtaining the length of the reference blank symbol based on length information of the reference blank symbol comprises:
obtaining the length of the reference blank symbol based on the first subcarrier spacing in the subcarrier spacing set.

18. The base station according to claim 17, wherein the obtaining the length of the reference blank symbol based on the first subcarrier spacing in the subcarrier spacing set comprises:

using, as the length of the reference blank symbol, duration corresponding to a sum of a derivative and a cyclic prefix that are of the first subcarrier spacing.

19. The base station according to claim 16, wherein the length information of the reference blank symbol comprises a mini slot set comprising mini slots corresponding to the plurality of subcarrier spacings; and the obtaining the length of the reference blank symbol based on length information of the reference blank symbol comprises:
obtaining the length of the reference blank symbol based on a first mini slot in the mini slot set, wherein the first mini slot is a maximum mini slot in the mini slot set, and the first mini slot is a mini slot corresponding to the first subcarrier spacing.

20. The base station according to claim 16, wherein the length information of the reference blank symbol comprises any one of the following: a subcarrier spacing corresponding to the reference blank symbol, the length of the reference blank symbol, and a mini slot corresponding to the reference blank symbol.

21. The method according to claim 1, wherein the use of the blank symbol, by the base station, to perform a function other than transmission of service data and signaling comprises assessing whether all channels on a license-free spectrum are idle that can be used for sending data.

* * * * *

UNITED STATES PATENT AND TRADEMARK OFFICE
CERTIFICATE OF CORRECTION

| | | |
|---|---|---|
| PATENT NO. | : 11,108,531 B2 | Page 1 of 1 |
| APPLICATION NO. | : 16/369353 | |
| DATED | : August 31, 2021 | |
| INVENTOR(S) | : Zhao et al. | |

It is certified that error appears in the above-identified patent and that said Letters Patent is hereby corrected as shown below:

On the Title Page

Applicant item (71): "HUAWEI TECHNOLOGIES CO., LTD., Guangdong (CN)" should read
-- HUAWEI TECHNOLOGIES CO., LTD., Shenzhen (CN) --.

Signed and Sealed this
Nineteenth Day of December, 2023

*Katherine Kelly Vidal*

Katherine Kelly Vidal
*Director of the United States Patent and Trademark Office*